(12) United States Patent
Yun et al.

(10) Patent No.: US 10,493,702 B2
(45) Date of Patent: Dec. 3, 2019

(54) THERMOPLASTIC RESIN COMPOSITE AND METHOD OF PREPARING THE SAME

(71) Applicants: Hyundai Motor Company, Seoul (KR); Kia Motors Corporation, Seoul (KR)

(72) Inventors: Deok Woo Yun, Gyeonggi-do (KR); Hyun Min Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 793 days.

(21) Appl. No.: 14/922,683

(22) Filed: Oct. 26, 2015

(65) Prior Publication Data
US 2016/0375642 A1    Dec. 29, 2016

(30) Foreign Application Priority Data

Jun. 29, 2015   (KR) .................. 10-2015-0092448

(51) Int. Cl.
| | | |
|---|---|---|
| B29C 70/04 | (2006.01) | |
| B29C 70/50 | (2006.01) | |
| B29K 23/00 | (2006.01) | |
| B29K 105/00 | (2006.01) | |
| B29K 223/00 | (2006.01) | |

(52) U.S. Cl.
CPC ............ B29C 70/04 (2013.01); B29C 70/506 (2013.01); *B29K 2023/06* (2013.01); *B29K 2023/12* (2013.01); *B29K 2105/0085* (2013.01); *B29K 2105/256* (2013.01); *B29K 2223/12* (2013.01); *B29K 2313/00* (2013.01)

(58) Field of Classification Search
None
See application file for complete search history.

(56) References Cited

U.S. PATENT DOCUMENTS 3,286,007 A * 11/1966 Campbell ................ D04H 1/60
                                                                                     264/109
8,021,592 B2    9/2011 Ward et al.
8,052,913 B2    11/2011 Ward et al.

FOREIGN PATENT DOCUMENTS

| JP | 59-198146 A | 11/1984 |
|---|---|---|
| JP | 05-245866 | * 9/1993 |
| JP | 09-011404 | * 1/1997 |
| JP | 09-011404 A | 1/1997 |
| JP | 3098839 B2 | 10/2000 |
| JP | 3130288 B2 | 1/2001 |
| JP | 2015-224297 A | 12/2015 |
| KR | 2014-0005409 A | 1/2014 |

* cited by examiner

*Primary Examiner* — Matthew J Daniels
*Assistant Examiner* — Mohammad M Ameen
(74) *Attorney, Agent, or Firm* — Mintz Levin Cohn Ferris Glovsky and Popeo, P.C.; Peter F. Corless

(57) ABSTRACT

Disclosed is a resin composite having improved tensile properties and a method of preparing the same. Particularly, the resin composite comprises a matrix resin and a reinforcement resin which are made of thermoplastic resin compositions.

12 Claims, 8 Drawing Sheets

PRIOR ART

PRIOR ART

THERMOPLASTIC RESIN COMPOSITE AND METHOD OF PREPARING THE SAME

CROSS-REFERENCE TO RELATED APPLICATION

This application claims the benefit of priority to Korean Patent Application No. 10-2015-0092448 filed with the Korean Intellectual Property Office on Jun. 29, 2015, the entire contents of which are incorporated herein by reference.

TECHNICAL FIELD

The present invention relates to a thermoplastic resin composite and a method of preparing the same, and more particularly. In particular, the thermoplastic resin composite may be a self-reinforced thereby having improved physical properties.

BACKGROUND

Fiber reinforced plastics (FRPs) have been widely used as composite materials in various fields, for example, civil engineering and architectural fields, a transportation field, electronic device fields, aviation and aerospace fields, and the like. The thermosetting resin such as an unsaturated polyester resin, a vinyl ester resin, an epoxy resin, a phenol resin, or the like, or a thermoplastic resin such as polyethylene, polypropylene, an acrylonitrile-butadiene-styrene (ABS) resin, polycarbonate, polyacetal, polyamide, polystyrene, polyphenylene sulfide, or the like has been used as a matrix resin in the FRP, and an inorganic fiber such as a glass fiber, a metal fiber, a ceramics fiber, a carbon fiber, or the like, or an organic fiber such as a natural fiber, a polypropylene fiber, a polyamide fiber, a polyester fiber, a polyacrylate fiber, a polyimide fiber, or the like have been used in various forms as a reinforcement fiber. Among these reinforcement materials, particularly, the glass fiber has been mainly used.

Generally, the FRP includes a resin matrix and a reinforcement material which are made of different materials. For example, a FRP using the inorganic fiber such as the glass fiber or the like, or a FRP using an organic fiber made of a different material from that of the resin matrix may have a disadvantage in recyclability of FRP. Therefore, a FRP including the resin matrix and the reinforcement materials which are made of similar compositions, such as thermosetting or thermoplastic polymer resins, and having excellent recyclability has been developed.

In the related arts, an exemplary method of preparing a FRP including the same resin matrix and reinforcement material, the reinforcement material with a high strength and high elasticity fiber or film made of a thermoplastic resin, or the matrix resin which is the same thermoplastic resin as the reinforcement material can be dissolved in an organic solvent, heated and compacted to form a composite. However, since the method uses the solvent, it may cause an environmental contamination. Therefore, a method being capable of simple and efficient method of preparing a FRP having high strength and excellent recyclability has been demanded without generating a negative environmental influence.

For instance, JP Patent No. 3,130,288B discloses a method of obtaining a stretched isotactic polypropylene fiber having a high strength, low elongation, high Young's modulus, high melting point, and low thermal shrinkage ratio, by stretching a crystalline polypropylene fiber at a high stretch ratio under pressurized saturated steam of 0.20 Mpa or more.

Further, U.S. Pat. No. 8,052,913B discloses a simple and efficient method of preparing a polyolefin resin mold reinforced with a polypropylene-based fiber, which has a high strength and excellent recyclability and can be applied to various uses. Specifically, the method includes compacting step of a ply laminating an unstretched matrix layer having a low melting point as an intermediate layer between stretched polymer reinforcement materials under a specific time, temperature and pressure conditions, and cooling the compacted ply. The compacting process is preferably performed at a pressure of 10 MPa or less, and may be performed using a double belt press, or the like.

The physical properties of the resin composite manufactured by the above-mentioned documents depending on a compaction temperature are shown in FIG. 1.

Further, in the disclosure of U.S. Pat. No. 8,021,592, an assembly composed of two or more stretched webs made of polypropylene having a specific melting point, a recrystallization temperature, and a molecular weight is treated and compacted at elevated temperature and pressure conditions being sufficient to partially melt polypropylene, and cooled at a temperature lower than the recrystallization temperature and an elevated pressure condition, at a cooling rate of 35)° C./minutes or higher. The tensile properties of the composite depending on a cooling condition of the resin composite at the time of compact molding are illustrated in FIG. 2.

In the methods disclosed in above U.S. Pat. Nos. 8,052, 913 and 8,021,592, a batch-type heating and compaction method using a hot press is used to prepare a self-reinforced composite, however, the batch-typed and discontinuous methods using hot press equipment may deteriorate productivity.

Therefore, a FRP composed of the same materials of matrix resin and a reinforcement resin and a method of preparing the same for achieving high productivity in a continuous process, have been still required.

SUMMARY OF THE INVENTION

In preferred aspects, the present invention provides a resin composite that can be used as FRPs, and a method of preparing the same. In particular, the resin composition may comprise a matrix resin and a reinforcement resin which are made from polymeric resins such as thermoplastic resin, as such the those materials can be recycled without separating polymeric materials from the inorganic materials.

In one aspect, provided is a method of preparing a resin composite.

The method may comprise: melting a reinforcement resin and a matrix resin; and impregnating the reinforcement resin into the matrix resin to form the resin composite.

The resin composite may be prepared using a double belt press laminator which may be divided into at least sections. Particularly, a first section of the double belt press laminator may be located closest to a resin injection part of the laminator and a second section of the double belt press laminator may be located next to the first section, Preferably, a temperature in the double belt press laminator may decrease from the resin injection part to a resin discharge part of the laminator.

In particular, a temperature of the first section ($T_1$) may be in a range of about $(T_m-5)°$ C. to $(T_m+5)°$ C. as $T_m$ being a melting temperature of the reinforcement resin.

Preferably, the resin composition may be prepared in continuous process using the double belt press laminator.

The method may further comprise recrystallizing the formed resin composite in the second section. In particular, a temperature of the second section ($T_2$) may be in a range of about ($T_m-70$)° C. to ($T_m-50$)° C. as $T_m$ being a melting temperature of the reinforcement resin.

Preferably, the temperature of the second section ($T_2$) may be lowered by using a cooling apparatus positioned between the first and second sections, and the cooling apparatus is installed between the first and second sections.

The method may further comprise laminating the matrix resin and the reinforcement resin before the melting the reinforcement resin and the matrix resin.

The double belt press laminator may comprise four or more sections having different temperature conditions. The first section of such double belt press laminator may be located closest to the resin injection part of the laminator and the second section, the third and the fourth sections may be located sequentially from the first section to the resin discharge part.

Preferably, the temperature of the second section ($T_2$) may be in a range of about ($T_m-70$)° C. to ($T_m-50$)° C., a temperature of the third section ($T_3$) may be in a range of about ($T_m-90$)° C. to ($T_m-80$)° C., and a temperature of the fourth section ($T_4$) may be in a range of about ($T_m-110$)° C. to ($T_m-90$)° C., as $T_m$ being a melting temperature of the reinforcement resin.

Preferably, a ratio of an interval between the double belts of laminator to a thickness of the laminated matrix resin and the reinforcement resin may range from about 0.75 to about 0.95.

Preferably, the matrix resin may be in a form of a film, and the reinforcement resin may be in a form of a fiber or fabric.

Preferably, the matrix resin and the reinforcement resin may have a melting temperature of about 130 to 165° C.

The matrix resin and the reinforcement resin may be thermoplastic resin comprising at least one selected from the group consisting of polyethylene, polypropylene, an acrylonitrile-butadiene-styrene (ABS) resin, polycarbonate, polyacetal, polyamide, polystyrene, and polyphenylene sulfide. Alternatively, the matrix resin and the reinforcement resin may be polyolefin resin.

The double belt press laminator may include each the first and second section of the laminator which is driven by a separate roller, or when the double belt press laminator comprises four or more of divided sections, each section of the laminator may be driven by a separate roller.

The resin composite as prepared by the above described method may have specific gravity of about 0.880 to 0.900, a tensile strength of about 0.80 to 1.10, and a tensile modulus of about 0.80 to 1.1.

Further provided is a resin composite prepared using the method as described herein.

Other aspects of the present invention are disclosed infra.

DETAILED DESCRIPTION

Figure 1:
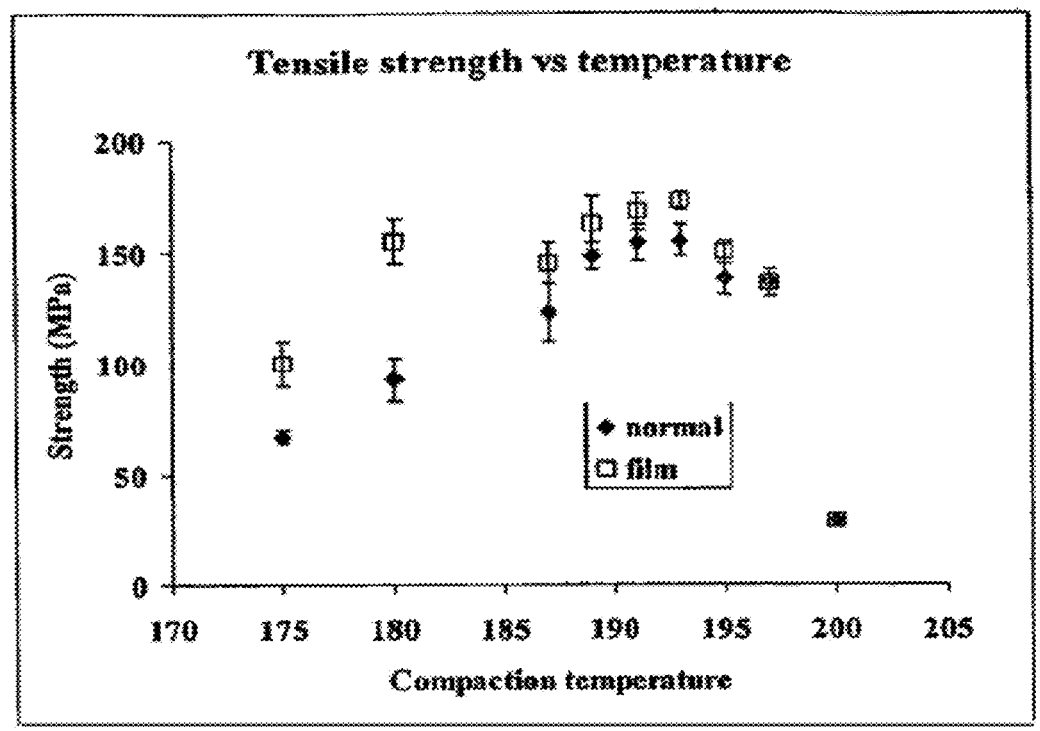
FIG. 1 illustrates the physical properties of a thermoplastic resin composite depending on a compression temperature of the resin composite prepared by a conventional method.
Figure 2:
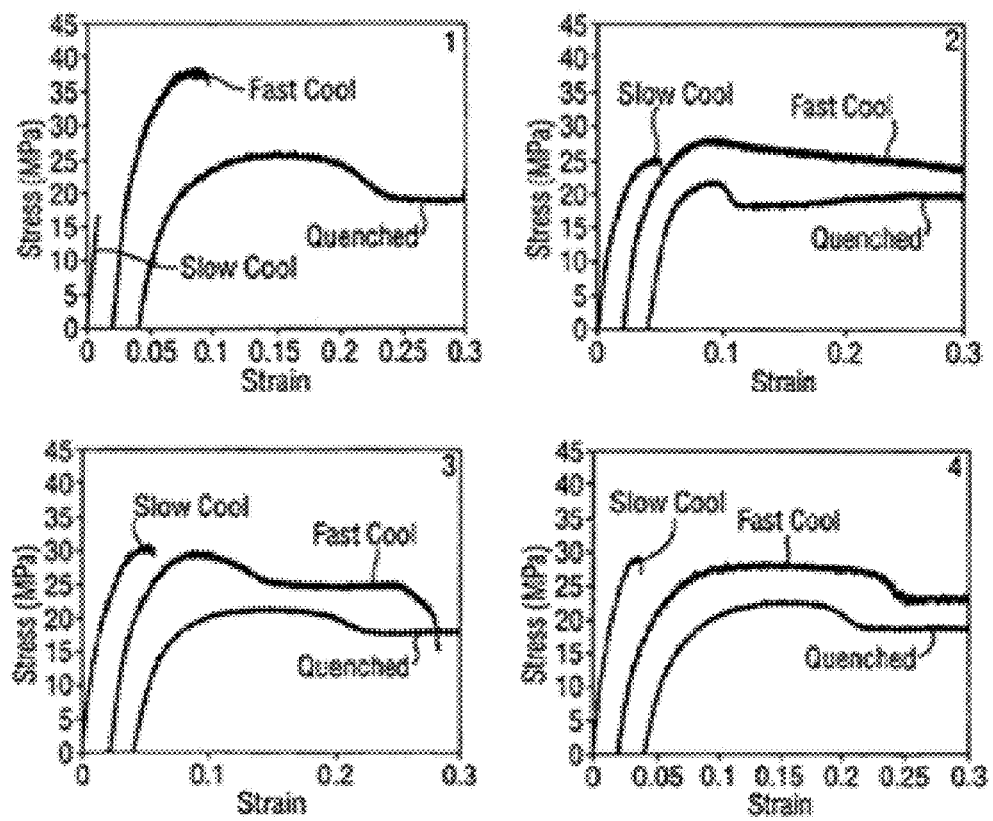
FIG. 2 illustrates the tensile properties of a thermoplastic resin composite depending on a cooling condition of the resin composite prepared by a conventional method.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a resin composite and a method for manufacturing the same according to various exemplary embodiments will be explained in detail.

In one aspect, the present invention provides a resin composite having improved tensile properties, and the resin composite may comprise a matrix resin and a reinforcement resin. In particular, the matrix resin and the reinforcement resin may have same composition. In certain aspect, the resin composite of the present invention may comprise a thermoplastic resin composite, and be a self-reinforced resin composite.

In another aspect, the present invention provides a method of preparing the above resin composite having improved tensile properties by controlling the process conditions such as a temperature, a pressure, and the like of each process.

An exemplary embodiment of the present invention provides a self-reinforced thermoplastic resin composite having improved tensile properties, and a method of preparing the same.

In addition, an exemplary embodiment of the present invention provides a method of preparing a thermoplastic resin composite using a double-belt press laminator, instead of a batch-typed discontinuous process, by controlling the process parameters and the optimal properties of a self-reinforced composite. In particular, the method may be performed in continuous process. Thus, the method of present invention can achieve an improvement in the physical properties and the productivity.

In an exemplary embodiment, a self-reinforced thermoplastic composite may be prepared by using a double belt laminator with a higher productivity than the compression molding. In the related arts, the compression cooling process may be required for performing a recrystallization step after a melting step of thermoplastic resin. Thus, the temperature can be controlled to be suitable for each section of double-belt laminator, so as to produce the self-reinforced composite with excellent properties.

A conventional laminating method using a double-belt laminator has been used largely for preparing the thermoplastic prepreg. The prepreg is a sheet-type product used as an intermediate material for producing the molded composite which may be prepared by using the matrix resin impregnated into the reinforcement fiber beforehand.

Figure 3:
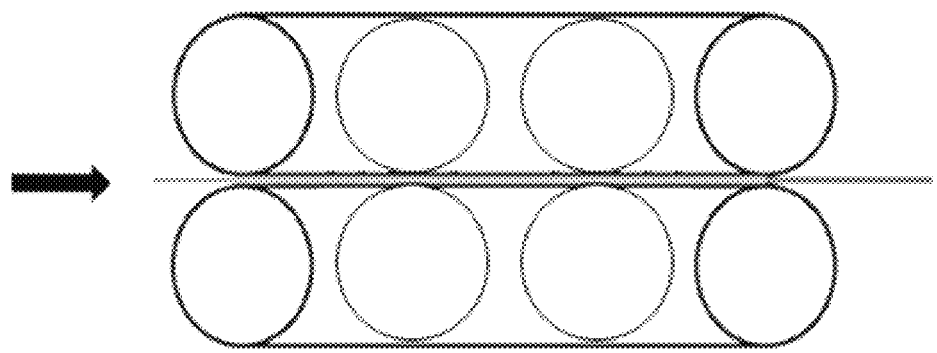
FIG. 3 illustrates an exemplary internal sections of an exemplary double belt press laminator used in an exemplary embodiment of the present invention.

As illustrated in FIG. 3, a double-belt typed heating/pressing apparatus may continuously apply the heat and the pressure on the thermoplastic prepreg by using a continuous metal belt positioned at upper and lower parts of the thermoplastic prepreg. The heating/pressing apparatus with double belt press type may be mainly used in a continuous process.

The thermoplastic resin composite including the same thermoplastic resin composition of matrix resin and a reinforcement resin may have a different thermal stability from a thermoplastic prepreg which includes a carbon/glass fiber as a reinforcement material in the conventional art. Further, in a manufacturing process, the resin composite of the present invention may require a suitable temperature condition for preventing the physical properties from being deteriorated due to the heat shrinkage of the thermoplastic reinforcement material. Therefore, in the case that the conventional heating/pressing apparatus in double belt type and the manufacturing conditions applied for the prepreg preparation are used for the thermoplastic resin composite of the present invention, the physical properties of the reinforcement resin may be deteriorated due to shrinkage and melting of the reinforcement resin caused by heat.

Accordingly, the method of preparing a resin composite according to an exemplary embodiment of the present invention may include melting a reinforcement resin and a matrix resin, and impregnating the reinforcement resin into the matrix resin. Preferably, the method may further include a recrystallizing step of the impregnated resin composite. In addition, before the melting and impregnating, the method may further include a laminating step of the matrix resin and the reinforcement resin.

In the melting and impregnating steps, the laminated resins used for preparing the resin composite may be injected into inside of double belt laminator and the reinforcement resin may be melted and thus impregnated into the matrix resin by being applied with heat and pressure.

As used herein, the term, "a reinforcement material for self-reinforced resin composite" means a resin in a broad meaning, and is distinguished from an inorganic fiber such as carbon fiber, glass fiber, and the like, as a reinforcement material in related art. In a preferred aspect, the reinforcement material for self-reinforced resin composite means a resin which has the same or similar physical properties of a matrix resin. For example, the self-reinforced property of reinforcement material may be determined by differential scanning calorimetry (DSC). When the composite made from the same resin composition of matrix and reinforcement material is analyzed by DSC analysis, the "self-reinforced" material may mean the materials characterized by a single melting temperature ($T_m$) peak at a primary heating peak, instead of two different peaks.

In the present invention, as the matrix resin and the reinforcement resin, all of the thermoplastic resin known in the art may be used, but are not particularly limited.

In an exemplary embodiment of the present invention, the matrix resin may be in a form of a film, and the reinforcement resin may be in a form of a fiber or fabric. The matrix resin and the reinforcement resin may be thermoplastic resins having a melting temperature of about 130 to 165° C.

The examples of the self-reinforced material can include a thermosetting resin such as an unsaturated polyester resin, a vinyl ester resin, an epoxy resin, a phenol resin or the like, and a thermoplastic resin such as polyethylene, polypropylene, an acrylonitrile-butadiene-styrene (ABS) resin, polycarbonate, polyacetal, polyamide, polystyrene, polyphenylene sulfide or the like. The reinforcement resin, as used herein, may be a resin having physical properties equal or similar to those of the matrix resin. The matrix resin and the reinforcement resin may be polyolefin resins such as homopolymers, heteropolymers, or copolymers including an aliphatic olefin having a C2 to C4 a repeating unit. Examples of the polyolefin resin may include polyethylene, polypropylene, a copolymer of polyethylene and polypropylene, and the like.

The method of preparing a resin composite according to an exemplary embodiment of the present invention may include, by using a double belt press laminator divided into at least two different temperature sections: melting the reinforcement resin and the matrix resin; and impregnating the reinforcement resin into the matrix resin. Accordingly, at least two sections, for example, a first section and a second section, may be arranged sequentially from a resin injection part of the laminator to a resin discharge part thereof, and those sections may have a temperature gradient that is decreasing from the resin injection part of the laminator to the resin discharge part thereof.

In the first section, the reinforcement resin may be melted and impregnated into the matrix resin. Particularly, the temperature of the first section ($T_1$) disposed to be closest to the resin injection part may be in a range of about ($T_m-5$)° C. to ($T_m+5$)° C. as $T_m$ being a melting temperature of the reinforcement resin. When the temperature of the first section is lower than the predetermined range, for example, $T_1$ is less than ($T_m-5$)° C., the tensile modulus of elasticity by impregnation may deteriorate due to the heat deficiency. When the temperature of the first section is greater than the predetermined range, for example, $T_1$ is greater than ($T_m+5$)° C., the physical properties may deteriorate due to melting of the reinforcement material. Accordingly, it is preferable that the temperature of the first section ($T_1$) is in a range of about ($T_m-5$)° C. to ($T_m+5$)° C.

After the melting and impregnating of the reinforcement resin into the matrix resin, the method of preparing a thermoplastic resin composite according to an exemplary embodiment of the present invention may further include a step of recrystallizing the melted and impregnated resin composite in the second section. A temperature of a recrystallization section or the second section ($T_2$) may be is in a range of about (Tc–5)° C. to ($T_c+5$)° C. as $T_c$ represents a recrystallization temperature of the reinforcement resin, or in a range of −70° C. from the melting temperature ($T_m$) of the reinforcement resin to −50° C. from $T_m$, that is from about ($T_m-70$)° C. to ($T_m-50$)° C. The temperature of the recrystallization section may be determined by considering an effect of increased physical properties due to the crystalline structure of resin which is formed by heat treatment of resin at the recrystallization temperature after the melting. After recrystallization section, the resin may be cooled to form a shape. The recrystallization temperature may be measured for example, by Tc of DSC.

Since the temperature of the second section ($T_2$) is less than that of the first section ($T_1$), the temperature of the second section may be lowered by using a cooling apparatus located between the first and second sections. For example, a cooling unit of the belt may be installed between the first and second sections. In the cooling step, the resin composite may be cooled in a press state after the melting and impregnating steps, such that shrinkage of a fiber reinforcement material may be prevented. The cooling step can increase dimensional stability by preventing the reinforcement resin shrinkage and maintains the physical properties of the fiber reinforcement resin. The cooling temperature may be gradually lowered from the temperature of the melting and impregnating steps to room temperature.

The double belt press laminator may be divided into at least two sections having the different temperature conditions, for example, the double belt press laminator may be divided into two, three, four, five portions, or the like. In an exemplary embodiment of the present invention, when the laminator has at least two sections, each section may be operated separately driven by separate rollers, and the temperature of each section may be controlled separately.

As shown in FIG. 3, the double belt press laminator may include four or more sections having the different temperature conditions where the sections may be sequentially divided into a first section, a second section, a third section, and a fourth section located from the resin injection part of the laminator to the resin discharge part thereof. In particular, a temperature of the second section ($T_2$) may be in a range of about ($T_m-70$)° C. to ($T_m-50$)° C., a temperature of the third section ($T_3$) may be in a range of about ($T_m-90$)° C. to ($T_m-80$)° C., and a temperature of the fourth section ($T_4$) may be in a range of about ($T_m-110$)° C. to ($T_m-90$)° C.

In an exemplary embodiment of the present invention, the matrix resin and the reinforcement resin may be laminated before the melting and impregnating steps. In the laminating, the matrix resin and the reinforcement resin may be laminated in consideration of a thickness of a final product and be inserted into the double belts. The matrix resin and the reinforcement resin may be laminated in various combinations without limitation. For example, the matrix resin and the reinforcement resin may be staked in an order of the matrix resin, the reinforcement material and matrix resin.

Preferably, the ratio of an interval between the double belts of the laminator to a total thickness of laminate stacked with the matrix resin and the reinforcement resin may be of about 0.75 to 0.95. The ratio may influence the physical properties of the resin composite. Since the decreased belt interval may increase the lamination pressure, the tensile stiffness of the resin composite may be increased. This change in the physical properties may be caused by increased impregnation rate due to the elevated pressure and by decreased air gap (increased specific gravity). When the ratio is less than the predetermined range, for example, less than about 0.75, the materials may not be uniformly laminated/compressed, such that a product may have non-even thickness and bad appearance. Meanwhile, a roll gap is greater than the predetermined range, for example, greater than about 0.95, the tensile modulus of elasticity may be excessively decreased.

In the method of preparing the thermoplastic resin composite according to the present invention, the retention time of the resin in the laminator may be affected by various conditions, and thus may be suitably selected.

The thermoplastic resin composite as described above or manufactured according to exemplary methods of the present invention may have improved tensile properties and specific gravity of about 0.880 to 0.900, tensile strength of about 0.80 to 1.10, and tensile modulus of about 0.80 to 1.1.

The present invention provides the resin composite may the matrix and the reinforcement material which are selected from the thermoplastic resins, and the method of preparing the same to achieve the high productivity in the continuous process. The resin composite having substantially physical properties may be prepared by controlling process conditions such as a temperature, a pressure and the like. In addition, the resin composite may be widely used in various fields, for example, civil engineering and architectural fields, a transportation field such as vehicle materials, or the like, electronic and electric device fields, aviation and aerospace fields and the like.

EXAMPLE

The present invention will be described in more detail through the following Examples, but the scope of the present invention is not limited to the following Examples.

Example 1

Preparation of Resin Composite

In order to prepare a resin composite, a reinforcement resin fiber and a matrix resin were prepared. Specifically, a homopolypropylene resin (FR 150, Lotte Chemical, MI: 10, $T_m$: 166° C., Mw: 230,000) was used as the reinforcement resin. A grey yarn was prepared by using the reinforcement resin and was weaved to for a fabric obtained by 1:1 plain weaving the fiber was used. A propylene/ethylene copolymer resin (MI: 25, $T_m$: 130° C.) was manufactured in a film form and used as the matrix resin.

In order to stack three layers which was sequentially composed of a fiber reinforcement material/a matrix/the fiber reinforcement material, the reinforcement resin and the matrix resin were mounted on a roll shaped unwinder, and sequentially laminated while being transported from the unwinder, such that the laminator of reinforcement resin and the matrix resin were inserted into a double belt press laminator. The simple stacked sample before being processing had a thickness of 0.56 mm, and the double belt laminator was operated at a belt speed of 8 mm/sec and a retention time of 150 seconds with a belt interval (roll gap) of 0.5 mm. The double belt press laminator included four divided sections, and a schematic view specifically indicating four sections of the double belt press is illustrated in FIG. 3. In the present Experiment, the four sections had the same belt temperature of $T_m-5$° C., and a belt interval of 0.5 mm.

As physical properties of a self-reinforced composite prepared by the method, specific gravity was measured according to ISO-1183, and tensile strength and tensile modulus of elasticity were measured according to ISO-527.

As a result, the obtained self-reinforced composite had specific gravity of 0.874, tensile strength of 0.88, and tensile modulus of 0.30.

Example 2

Evaluation of Effect of Lamination Temperature

As Example 1, a reinforcement resin and a matrix resin were prepared and a resin composite was prepared using a double belt laminator, except for the temperature of double belts laminator. That is, the belt temperature in first to fourth sections of double belt were equally set as four temperatures, such as $(T_m-10)°$ C., $(T_m-5)°$ C., $T_m$, and $(T_m+5)°$ C. of a fiber reinforcement material, the melting temperature for Experiments 1 to 4.

Figure 4:
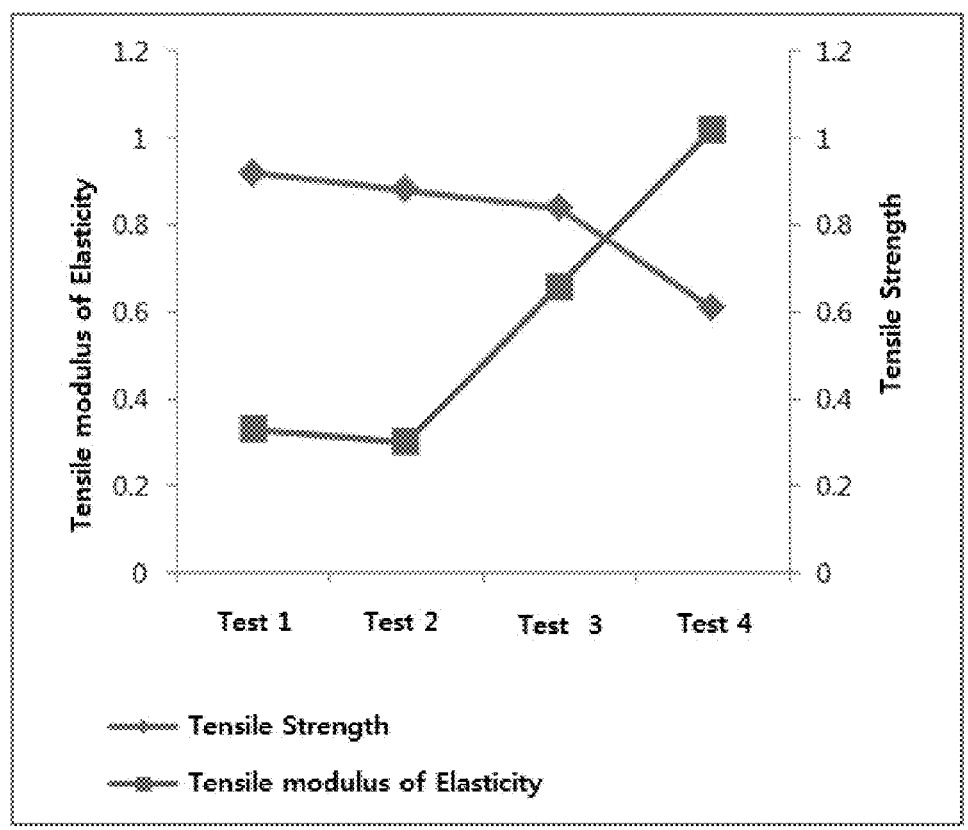
FIG. 4 is a graph showing changes in physical properties of an exemplary resin composite depending on compression temperature in an exemplary embodiment of the present invention.

Specific gravity, tensile strength and tensile modulus of the self-reinforced composite prepared by the method were measured by the same method as Example 1, and the results were illustrated in the following Table 1 and FIG. 4. FIG. 4 is a graph illustrating the changes in physical properties depending on a double belt lamination temperature.

TABLE 1

| Classification | Experiment 1 | Experiment 2 | Experiment 3 | Experiment 4 |
| --- | --- | --- | --- | --- |
| Temperature (° C.) of four sections | $(T_m-10)$ ° C. | $(T_m-5)$ ° C. | $(T_m+0)$ ° C. | $(T_m+5)$ ° C. |
| Specific Gravity | 0.869 | 0.874 | 0.891 | 0.897 |
| Tensile Strength | 0.92 | 0.88 | 0.84 | 0.61 |
| Tensile Modulus | 0.33 | 0.30 | 0.66 | 1.02 |

As illustrated in Table 1 and FIG. 4, in the case of increasing a processing temperature in a double belt press lamination process, tensile modulus of the obtained resin composite was increased, but tensile strength was decreased. The increased stiffness of the resin composite may be caused by increased impregnation rate and decreased air gap. In addition, the decreased tensile strength may be caused by decreased physical properties of the reinforcement material itself by melting of the reinforcement fiber. Therefore, by cooling the resin composite after applying heat to the melting of reinforcement material, the strength and stiffness must be maintained, with preventing deterioration of the physical properties of the reinforcement resin.

Example 3

Effect of Lamination Pressure

As Example 1, a reinforcement resin and a matrix resin were prepared and a resin composite was prepared using a double belt laminator, except for the ratio of roll gap of double-belt laminator to the stacked resins. That is, the ratio of roll gap of double-belt laminator to the stacked resins was set to 0.71 (0.4 mm roll gap), 0.89 (0.5 mm roll gap), or 1.07 (0.6 mm roll gap).

Specific gravity, tensile strength and tensile modulus of the self-reinforced composite prepared by the method were measured by the same method as Example 1, and the results were illustrated in Table 2. In the appearance evaluation in the following Table 2, when the arrangement of the woven fiber was not deformed and the thickness change and the fiber arrangement defect due to bending or folding in the processing, the appearance was evaluated as the term "good" state.

TABLE 2

| Classification | Experiment 5 | Experiment 6 | Experiment 7 |
| --- | --- | --- | --- |
| Roll Gap (mm) | 0.71 | 0.89 | 1.07 |
| Specific Gravity | 0.885 | 0.874 | 0.869 |
| Tensile Strength | 1.17 | 0.88 | 0.65 |
| Tensile Modulus | 0.70 | 0.30 | 0.14 |
| Appearance | Wrinkle Pattern (Defective) | Good | Good |

The present Example was performed to test a change in physical properties of the obtained resin composite depending on an increased lamination pressure. When the decreased belt interval was set to increase the lamination pressure, tensile stiffness of the obtained resin composite was increased. This change in the physical properties was caused by improved impregnation rate due to the pressure increase and air gap decrease, in other words, due to an increase in specific gravity. When the ratio of roll gap to the thickness of stacked materials was 0.71, the materials were not uniformly laminated and/or compressed, such that a thickness of a product was not uniform, and the appearance was not good. Therefore, it is preferable that the ratio of the roll gap to the thickness of stacked materials is 75% or greater. In the case in which the ratio of roll gap to the thickness of stacked materials was 1.07, tensile modulus of elasticity was excessively decreased.

Example 4

Effect of Retention Time of Resin in Belt

As Example 1, a reinforcement resin and a matrix resin were prepared and a resin composite was prepared using a double belt laminator, except for a retention time of the resin in a belt. That is, a retention time of the resin in a belt was set to 150 seconds and 470 seconds.

Specific gravity, tensile strength and tensile modulus of elasticity for the self-reinforced composite prepared by the method were measured by the same method as Example 1, and the results were illustrated in the following Table 3. When the woven state of the fiber reinforcement resin and the constant pattern were maintained after a double belt lamination process, the state was determined as good state. When the starting materials were overlapped or melted, so as to generating wrinkles, the state was determined as bad state.

Specific gravity, tensile strength and tensile modulus of the resin composite were measured, and the experimental results were illustrated in the following Table 3.

TABLE 3

| Classification | Example 1 | Experiment 8 |
| --- | --- | --- |
| Retention Time | 150 sec | 470 sec |
| Specific Gravity | 0.874 | 0.895 |
| Tensile Strength | 0.90 | 0.74 |
| Tensile Modulus | 0.30 | 1.13 |

In the case of increasing the retention time in the belt in a lamination process using a double belt press, tensile stiffness of the obtained resin composite was increased, but tensile strength thereof was decreased. These changes in the physical properties of the resin composite were caused by an increased energy amount applied on the sample. When the retention time was excessively short, the processing energy was not sufficiently transferred, so as to deteriorate the physical properties of resin composite. When the retention time was excessively long, the tensile strength of the reinforcement material was decreased due to shrinkage and melting by heat.

Example 5

Effect of Cooling Process (Recrystallization Section)

As Example 1, a reinforcement resin and a matrix resin were prepared and a resin composite was prepared using a double belt laminator, except that the temperature in each section of FIG. 3 was set differently as Experiments 9 to 12.

The temperatures of four sections were equally set in Experiment 9. In Experiments 10 to 12, the temperatures of the first to fourth sections were differently set with the temperature gradient being from the highest temperature at the closest section to the resin injection part of the laminator to the lowest temperature at the closest section to the resin discharge part. In addition, a retention time in each section was equally set. The temperature conditions in Experiments 9-12 were summarized in the following Table 4.

TABLE 4

| Classification | Experiment 9 | Experiment 10 | Experiment 11 | Experiment 12 |
|---|---|---|---|---|
| 1st Section (° C.) | Tm +0 | Tm −5 | Tm +0 | Tm +5 |
| 2nd Section (° C.) | Tm +0 | Tm −65 | Tm −65 | Tm −65 |
| 3rd Section (° C.) | Tm +0 | Tm −85 | Tm −85 | Tm −85 |
| 4th Section (° C.) | Tm +0 | Tm −100 | Tm −100 | Tm −100 |

Specific gravity, tensile strength and tensile modulus of the self-reinforced composite as Example 1, and the results were illustrated in Table 5.

TABLE 5

| Classification | Experiment 9 | Experiment 10 | Experiment 11 | Experiment 12 |
|---|---|---|---|---|
| Specific Gravity | 0.891 | 0.880 | 0.887 | 0.896 |
| Tensile Strength | 0.84 | 1.00 | 1.07 | 1.00 |
| Tensile Modulus | 0.66 | 0.83 | 0.91 | 1.00 |

In the case of performing a cooling process in the second to fourth sections after a heating process in the first section in FIG. 3, when the temperature of the first section ($T_1$) was increased to $T_m \pm 5°$ C., both of the tensile stiffness and tensile strength of the resin composite were increased. The causes of the physical properties changes of the resin composite was due to an increased melting and impregnation property of the matrix resin and/or reinforcement resin to the resin composite by increasing the temperature of the first section ($T_1$). In addition, the additional melting and the decreased physical properties of reinforcement resin was prevented by cooling the material under the pressured state and the recrystallization of the composite.

In Comparison of the results of Table 5 with those of Table 1, when the composite was prepared at the same temperature in all four sections, the higher melting temperature increased the specific gravity and tensile modulus of elasticity, but lowered the tensile strength. However, referring to Experiments 10 to 12 of Table 5, the higher melting temperature in the first section increased the specific gravity and tensile modulus, with maintaining the tensile strength. Specifically, in Experiment 2 of Table 1, the tensile strength was decreased and tensile modulus of elasticity was also excessively low (e.g. 0.30) at a temperature of $(T_m-5)°$ C. in the first section. However, in Experiment 10 of Table 5, both of the tensile strength and tensile modulus of elasticity were excellent.

Figure 5:
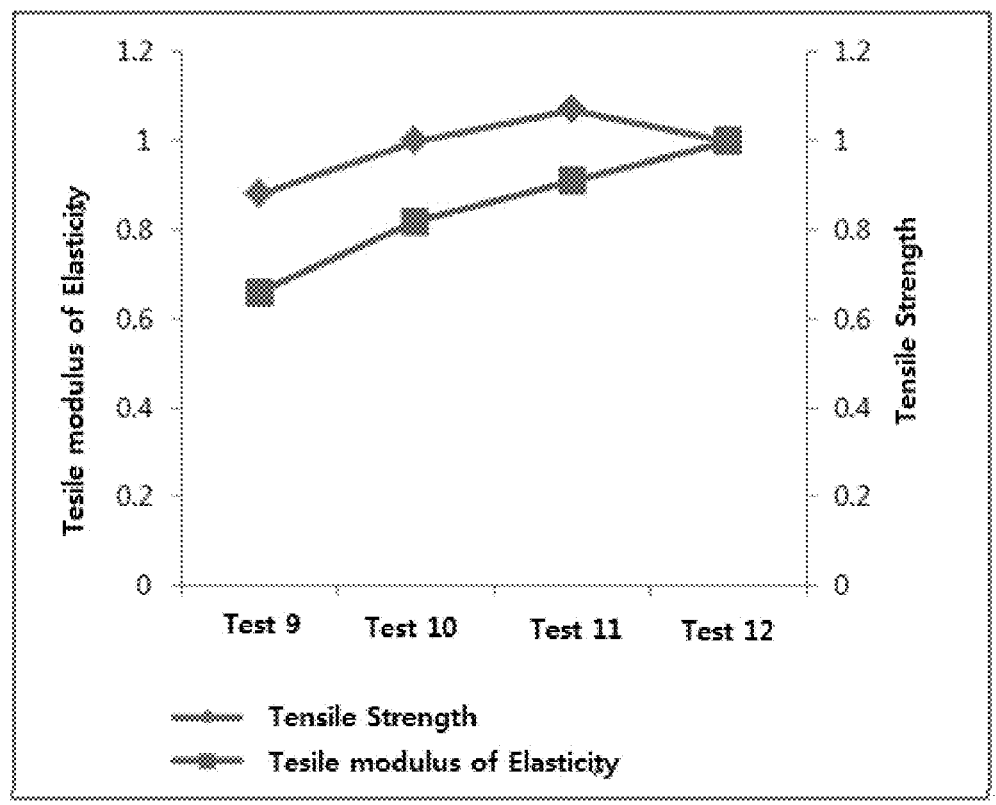
FIG. 5 is a graph showing changes in physical properties of an exemplary resin composite obtained by applying the recrystallization process in an exemplary embodiment of the present invention.

FIG. 5 is a graph showing changes in physical properties of an exemplary resin composite obtained by applying the recrystallization process in an exemplary embodiment of the present invention. The crystalline changes in the recrystallization section were summarized in the following Table 6 or FIGS. 6-8, which illustrated the changes in half width at various initial temperatures at the first section.

TABLE 6

| Half Width | Experiment 8 | Experiment 9 | Experiment 10 | Experiment 11 |
|---|---|---|---|---|
| 6.9° | 0.57 | 0.537 | 0.424 | 0.411 |
| 8.4° | 0.545 | 0.537 | 0.455 | 0.447 |
| 9.1° | 0.593 | 0.553 | 0.442 | 0.428 |
| 10.4° | 0.473 | 0.603 | 0.215 | 0.395 |
| 10.8° | 0.86 | 0.88 | 0.581 | 0.487 |

Figure 6:
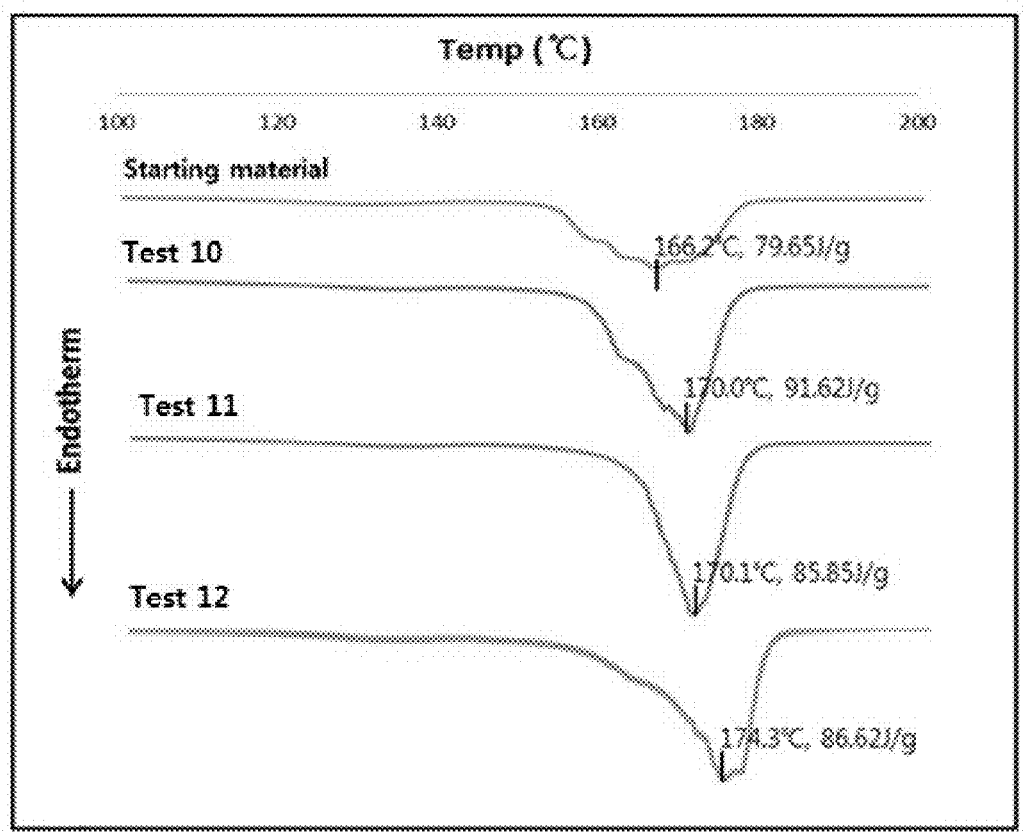
FIG. 6 is a DSC graph showing changes in melting point of exemplary resin composites obtained in an exemplary embodiment of the present invention.

FIG. 6 is a DSC graph showing the melting point change of the obtained resin composite. With respect to the starting materials of the composite before processing, the crystallinity and the melting temperature increased due to the heating and cooling treatment under the pressure, as the initial melting temperature increased.

Figure 7:
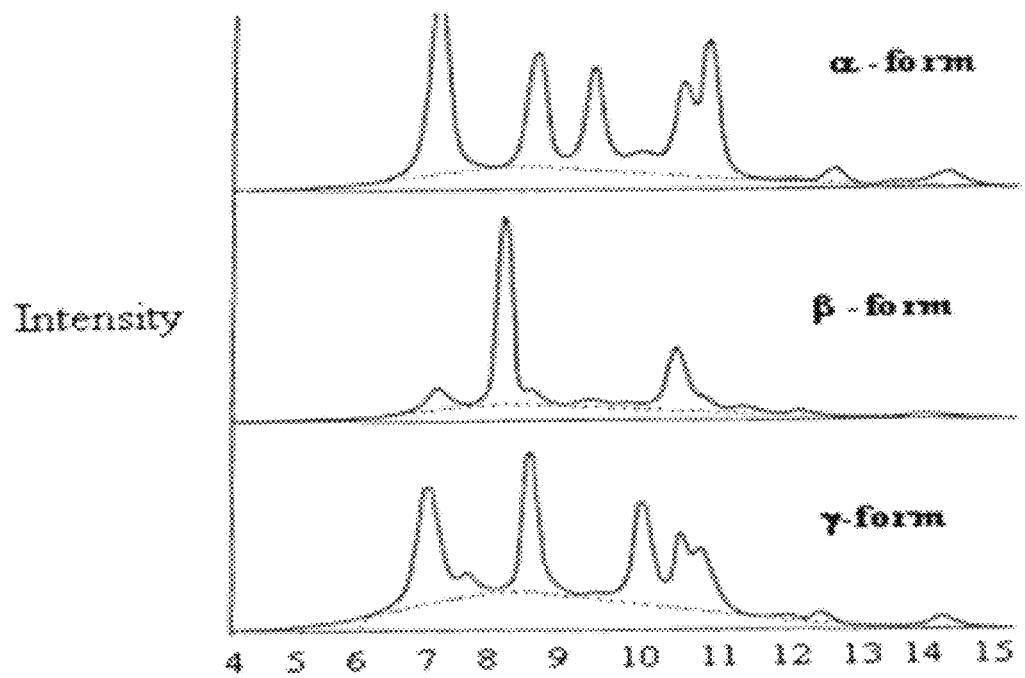
FIG. 7 illustrates a main crystalline structure of polypropylene in an exemplary embodiment of the present invention.
Figure 8:
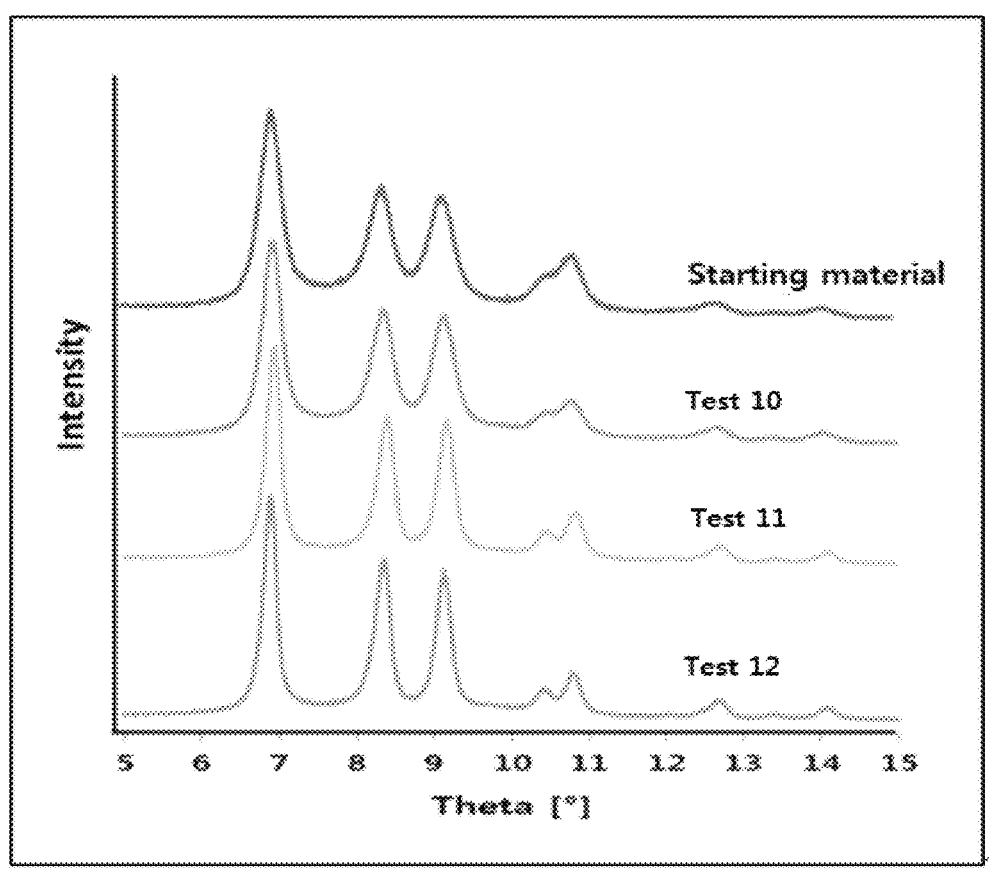
FIG. 8 illustrates exemplary configurations of polypropylene of exemplary resin composites obtained from XRD patterns in an exemplary embodiment of the present invention.

FIG. 7 illustrates the crystalline structures of the obtained resin composite. According to XRD graph of FIG. 8, as the initial melting temperature from the first section was increased before applying cooling under the pressure state, a XRD pattern approached to an alpha form, which is the most stable crystalline structure among crystalline structures of the resin illustrated in FIG. 7, and a half width was decreased. The decreased half width may indicate an increased crystallinity. In view of the results, as the initial melting temperature increased before applying cooling step under the pressure state, the tensile modulus of the composite increased. When the temperatures of all sections were equal, or when the temperature of the first section was lower than Tm −5° C., tensile modulus was decreased by the decreased impregnation due to a deficiency of heat. When the temperature of the first section was higher than Tm +5° C., the physical properties were deteriorated by the melting of the reinforcement material. Therefore, the temperature of the first section ($T_1$) may be preferably in a range of about $(T_m-5)°$ C. to $(T_m+5)°$ C.

What is claimed is:

1. A method of preparing a resin composite, comprising:
    melting a reinforcement resin and a matrix resin; and
    impregnating the reinforcement resin into the matrix resin to form the resin composite,
    wherein the resin composite is prepared using a double belt press laminator comprises four or more sections having different temperature conditions where a first section is closest to the resin injection part of the laminator and a second section, a third and a fourth sections are located sequentially from the first section to the resin discharge part,
    wherein a temperature in the double belt press laminator decreases from the resin injection part to a resin discharge part of the laminator, and a temperature of the first section ($T_1$) is in a range of about $(T_m-5)°$ C. to $(T_m+5)°$ C., a temperature of the second section ($T_2$) is in a range of about $(T_m-70)°$ C. to $(T_m-50)°$ C., a temperature of the third section ($T_3$) is in a range of about ($T_m$–90)° C. to ($T_m$–80)° C., and a temperature of the fourth section ($T_4$) is in a range of about ($T_m$–110)° C. to ($T_m$–90)° C., as $T_m$ being a melting temperature of the reinforcement resin, wherein a ratio of an interval between the double belts of laminator to a thickness of the laminated matrix resin and the reinforcement resin ranges from about 0.75 to about 0.95, and wherein the resin composite has specific gravity of about 0.880 to 0.900, a tensile modulus of about 0.80 to 1.1 Gpa, and a tensile strength of about 0.80 to 1.10 Mpa.

2. The method of claim 1, wherein the resin composite is prepared in continuous process.

3. The method of claim 1, further comprising recrystallizing the formed resin composite in the second section.

4. The method of claim 1, wherein the temperature of the second section ($T_2$) is lowered by using a cooling apparatus positioned between the first and second sections.

5. The method of claim 4, wherein a cooling apparatus is installed between the first and second sections.

6. The method of claim 1 further comprising, laminating the matrix resin and the reinforcement resin before melting the reinforcement resin.

7. The method of claim 1, wherein the matrix resin is in a form of a film, and the reinforcement resin is in a form of a fiber or fabric.

8. The method of claim 1, wherein the matrix resin and the reinforcement resin have a melting temperature of about 130 to 165° C.

9. The method of claim 1, wherein the matrix resin and the reinforcement resin are each a thermoplastic resin comprising at least one selected from the group consisting of polyethylene, polypropylene, an acrylonitrile-butadiene-styrene (ABS) resin, polycarbonate, polyacetal, polyamide, polystyrene, and polyphenylene sulfide.

10. The method of claim 1, wherein the matrix resin and the reinforcement resin are polyolefin resin.

11. The method of claim 1, wherein each the first and second section of the laminator is driven by a separate roller.

12. The method of claim 6, wherein each section of the laminator is driven by a separate roller.

* * * * *